United States Patent
Li et al.

(10) Patent No.: US 11,820,882 B2
(45) Date of Patent: Nov. 21, 2023

(54) METHOD FOR PREPARING LOW-COST FULLY-BIODEGRADABLE PLANT FIBER STARCH TABLEWARE

(71) Applicants: CHINA YUNHONG HOLDINGS CO., LTD., Hubei (CN); Guozhong Xinghe Biomedical Technology Co., Ltd., Hubei (CN); Yunhong Environmental Technology Co., Ltd., Hubei (CN)

(72) Inventors: Yubao Li, Hubei (CN); Jingren He, Hubei (CN); Dong Wu, Hubei (CN); Shuxin Ye, Hubei (CN); Sijia Jiang, Hubei (CN); Rui Zhang, Hubei (CN)

(73) Assignees: CHINA YUNHONG HOLDINGS CO., LTD., Huanggang (CN); Guozhong Xinghe Biomedical Technology Co., Ltd., Huanggang (CN); Yunhong Environmental Technology Co., Ltd., Huanggang (CN)

( * ) Notice: Subject to any disclaimer, the term of this patent is extended or adjusted under 35 U.S.C. 154(b) by 29 days.

(21) Appl. No.: 17/507,778

(22) Filed: Oct. 21, 2021

(65) Prior Publication Data

US 2022/0041842 A1    Feb. 10, 2022

(51) Int. Cl.
| | |
|---|---|
| *C08L 1/02* | (2006.01) |
| *C08J 9/04* | (2006.01) |
| *C08J 9/36* | (2006.01) |
| *A47G 19/03* | (2006.01) |
| *A47G 21/00* | (2006.01) |

(52) U.S. Cl.
CPC .............. *C08L 1/02* (2013.01); *A47G 19/03* (2013.01); *A47G 21/00* (2013.01); *C08J 9/04* (2013.01); *C08J 9/36* (2013.01); *C08J 2301/02* (2013.01); *C08J 2403/02* (2013.01); *C08J 2405/00* (2013.01); *C08L 2201/06* (2013.01); *C08L 2201/08* (2013.01); *C08L 2203/14* (2013.01); *C08L 2205/03* (2013.01)

(58) Field of Classification Search
CPC . A47G 19/03; A47G 21/00; C08J 9/04; C08L 1/02
See application file for complete search history.

(56) References Cited

U.S. PATENT DOCUMENTS

| | | | |
|---|---|---|---|
| 7,931,950 B2 | 4/2011 | Kim et al. | |
| 2022/0160017 A1* | 5/2022 | Kong | ............. A23L 29/03 |

FOREIGN PATENT DOCUMENTS

| | | | |
|---|---|---|---|
| CN | 101899173 A | | 12/2010 |
| CN | 102114189 A | * | 7/2011 |
| CN | 102926016 A | * | 2/2013 |

(Continued)

*Primary Examiner* — Seyed Masoud Malekzadeh
*Assistant Examiner* — Timothy G Hemingway

(57) ABSTRACT

Disclosed herein is a method for preparing a low-cost fully-biodegradable plant fiber starch tableware. A plant cellulose material containing dregs of *Scutellaria baicalensis* is modified to obtain a modified plant fiber starch blank. Konjac gum is subjected to pulverization and ultrafine pulverization to obtain a colloidal binder combined with a deacetylated konjac gum. The colloidal binder is mixed with the modified plant fiber starch blank to obtain a mixture. The mixture is subjected to foam molding in a forming mold to obtain the low-cost fully-biodegradable plant fiber starch tableware.

10 Claims, 1 Drawing Sheet

(56) References Cited

FOREIGN PATENT DOCUMENTS

| | | | | |
|---|---|---|---|---|
| CN | 104323946 | A | * | 2/2015 |
| CN | 106046824 | A | * | 10/2016 |
| CN | 106674943 | A | | 5/2017 |
| CN | 108651819 | A | * | 10/2018 |
| CN | 112220319 | A | | 1/2021 |
| CN | 112876745 | B | * | 3/2022 |

* cited by examiner

METHOD FOR PREPARING LOW-COST FULLY-BIODEGRADABLE PLANT FIBER STARCH TABLEWARE

CROSS-REFERENCE TO RELATED APPLICATIONS

This application claims the benefit of priority from Chinese Patent Application No. 202110694242.5, filed on Jun. 22, 2021. The content of the aforementioned application, including any intervening amendments thereto, is incorporated herein by reference in its entirety.

TECHNICAL FIELD

This application relates to degradable tableware, and more particularly to a method for preparing a low-cost fully-biodegradable plant fiber starch tableware.

BACKGROUND

Convenient and inexpensive packaging materials have come into daily life with the increase of demand for convenience and sanitation. However, those packaging materials are difficult to degrade after discarded, causing "white pollution" and threatening the environment. Meanwhile, the growing number of plant fibrous wastes such as crop straw, chaff and bagasse in agricultural production may cause serious environmental pollution if they are discharged into the environment without proper treatment.

There are many degradable tableware or packaging products on the market, but those products are still undesirable. For example, the degradable starch product is easy to mildew and has a high cost, hindering the promotion; the degradable cardboard requires a large amount of wood pulp, which is not environmentally friendly; and the degradable plastic product may mix with some toxic and harmful substances, and has an unpreferable degradation rate. In addition, the sanitation of the degradable tableware or packaging product is hard to control, and may do harm to the health of consumers. Furthermore, the degradable tableware or packaging product made of a bio-based biodegradable plastic such as polylactic acid (PLA) or a petrochemical-based biodegradable plastic such as polybutylene adipate terephthalate (PBAT) has a high production cost and is difficult to widely promote.

Therefore, the present disclosure performs the recycling, reuse and remanufacturing on plant fibrous waste resources to combine a high proportion (greater than 50%) of a plant fiber, a starch and a composite colloid to prepare a fully-degradable tableware or packaging product, which is easy to prepare, and has good antibacterial property and low cost.

SUMMARY

An object of the present disclosure provides a method for preparing a low-cost fully-biodegradable plant fiber starch tableware. The tableware provided herein meets the requirements in the national standard GB18006.1-2009—General requirement of plastic disposable tableware, and is safe and environmentally friendly with strong antibacterial performance, good degradation performance and use performance.

The technical solutions of the present disclosure are described as follows.

A method for preparing a low-cost fully-biodegradable plant fiber starch tableware, comprising:
S1: adding water into a plant cellulose material containing dregs of *Scutellaria baicalensis* followed by stirring to obtain a slurry; filtering the slurry to obtain a solid residue; subjecting the solid residue to drying, pulverization, sieving and ultrafine pulverization; adding a starch binder and a bio-degrading enzyme to the solid residue; adjusting temperature and water content of the solid residue; stirring the solid residue in a stirrer; and sending the solid residue to a twin-screw extruder for blending and extrusion to obtain a modified plant fiber starch blank;
S2: subjecting konjac gum to pulverization and ultrafine pulverization in sequence; adding water into the pulverized konjac gum followed by stirring to carry out a swelling treatment; separately adding water and $Ca(OH)_2$ into the swollen konjac gum followed by stirring; adding an adhesive to obtain a colloidal binder combined with a deacetylated konjac gum;
S3: mixing the colloidal binder with the modified plant fiber starch blank; adding an antibacterial agent, a stabilizer, a foaming promoter, a dispersant and a mold release agent followed by mixing and stirring to obtain a mixture; and quantitatively dividing the mixture; and
S4: subjecting the mixture to foam molding in a forming mold to obtain tableware; freely cooling the tableware to room temperature; and smoothing a surface of the tableware followed by drying to obtain fully degradable ecological tableware.

In some embodiments, a composition of the fully degradable ecological tableware comprises 60-70 parts by weight of the plant cellulose material, 0.3-0.6 part by weight of the bio-degrading enzyme, 10-20 parts by weight of the starch binder, 0.5-5 part(s) by weight of the colloidal binder, 0.5-8 part(s) by weight of the antibacterial agent, 0.5-1 part by weight of the stabilizer, 0.5-1 part by weight of the foaming promoter, 0.5-1 part by weight of the dispersant and 0.2-1 part by weight of the mold release agent.

In some embodiments, the plant cellulose material further comprises a material selected from the group consisting of *Artemisia argyi*, chaff, a straw, a melon vine, a honeysuckle vine, a melon skin, a corn stalk, a corn cob, bagasse, a yam skin, reed, bamboo, a bamboo leave and a combination thereof.

In some embodiments, the starch binder is a corn starch, a yam starch, a tuber starch, a wheat starch or a combination thereof; and the adhesive is xanthan gum, carrageenan, pectin or a combination thereof.

In some embodiments, the bio-degrading enzyme is a cellulase, a lyase, an amylase or a combination thereof.

In some embodiments, the antibacterial agent is chitosan, chitin or a combination thereof.

In some embodiments, stabilizer is ethylene glycol, propylene glycol, maltitol, xylitol, sorbitan monostearate or a combination thereof; and the foaming promoter is lauric acid, acetic acid, decanoate acid, caprylic acid, potassium bicarbonate, dipotassium hydrogen phosphate or a combination thereof.

In some embodiments, the dispersant is magnesium stearate, potassium carboxymethyl cellulose, potassium laurate, microcrystalline cellulose, carboxymethyl starch or a combination thereof; and the mold release agent is a sucrose fatty acid ester, a sucrose fatty acid polyester or a combination thereof; and a hydrophilic-lipophilic balance (HLB) value of the mold release agent is 3-6.

In some embodiments, the swelling treatment is performed for 30-40 min; and a ratio of the swollen konjac gum to the water 1:(25-100) (g/mL).

In some embodiments, the foam molding is performed under a molding pressure of 20 kPa with an upper-die temperature of 110-115° C. and a lower-die temperature of 105-110° C. for 30-40 s.

The beneficial effects of the present disclosure are described as follows.
1. The raw material provided herein is advantageous. *Artemisia argyi*, a broad-spectrum antibacterial and antiviral drug, can inhibit and kill on various bacteria and viruses, and has a certain prevention and treatment effect on respiratory diseases. An extract liquid of *Artemisia argyi* water has a good antibacterial effect on *Staphylococcus aureus* and *Escherichia coli*.
2. Baicalin is extracted from the raw medicinal material and dregs of *Scutellaria baicalensis*. Baicalin has a wide antibacterial range, and has a strong effect on *Staphylococcus aureus* and *Pseudomonas aeruginosa*. The antibacterial performance of ecological tableware is improved through adding with the dregs of *Scutellaria baicalensis*.
3. Starch-based biodegradable material products have good mechanical strength, strong flexibility, high impact resistance, strong temperature resistance, good water resistance and oil resistance. In addition, they have no softening, no deformation, and have strong plasticity.
4. Groups on macromolecular chains in the plant cellulose material and starch binder are activated under the catalysis of a biological enzyme, and are cross-linked under high temperature to improve the mechanical property of the composite material.
5. At present, most konjac glucomannan products have large particles and long swelling time, which is very inconvenient to use, especially in continuous production. The ball milling and ultrafine pulverization can shorten the swelling time of the konjac gum.
6. The konjac gum has a good synergistic thickening effect with a thickener such as xanthan gum, carrageenan and a starch.
7. The rural resource such as straw, wheat husk, bagasse and corncob has been fully used to turn waste into treasure. The product prepared herein has an overall structure, smooth and clean surface, and good strength. The outer surface of the product can be printed with trademarks, advertisements and manuals.
8. Starch is a kind of biodegradable natural polymer, which will be decomposed into glucose under the action of microorganisms, and finally decomposed into water and carbon dioxide, having no pollution to the environment. Other materials mixed with the starch are also fully degradable, and thus the lunch box prepared herein has excellent degradability, and becomes fertilizer when entering the soil and becomes feedstuff when entering the water.

BRIEF DESCRIPTION OF THE DRAWINGS

The technical solutions in the prior art and the present disclosure will be described more clearly below with reference to the accompany drawings. Obviously, the accompany drawings provided herein are merely a part of the embodiments of the present disclosure, and other drawings can be made by those skilled in the art without sparing creative work.

DETAILED DESCRIPTION OF EMBODIMENTS

The embodiments of the present disclosure will be described below with reference to the accompanying drawings to make the objects, technical solutions and beneficial effects of this disclosure clearer.

Example 1

Figure 1:
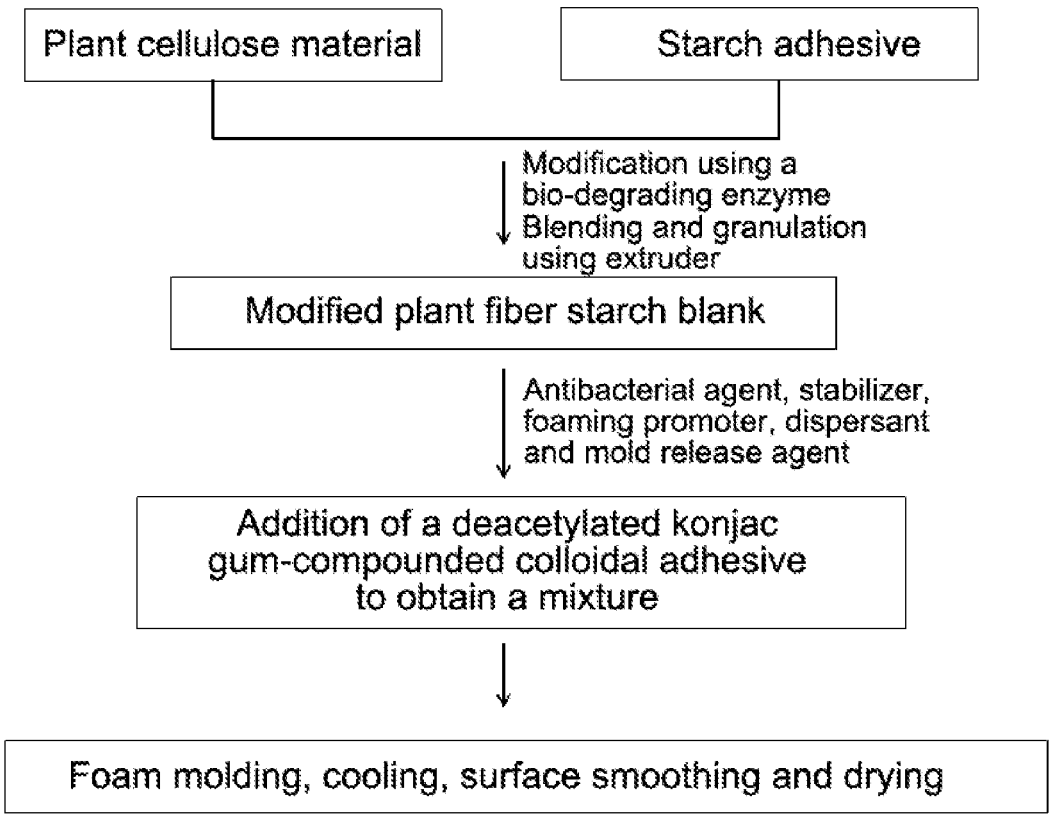
FIG. 1 is a flow chart of a method for preparing a low-cost fully-biodegradable plant fiber starch tableware according to an embodiment of the present disclosure.

Provided herein was a method for preparing low-cost fully-biodegradable plant fiber starch tableware as shown in FIG. 1.

(S1) A plant cellulose material containing dregs of *Scutellaria baicalensis* was added with water, and then was stirred to obtain a slurry. The slurry was filtered with a 100-mesh sieve to obtain a solid residue. The solid residue was subjected to drying, pulverization and sieving. The sieved solid resided was subjected to ultrafine pulverization using an airflow ultrafine pulverizer with a pressure of 0.7-1.0 MPa, a system blowing rate of 3-5 $m^3$/min and a classifier speed of 2000-2500 r/min. The pulverized solid residue was added with a starch binder and a bio-degrading, and was adjusted to have a temperature of 50-70° C. (preferably, 60° C.) and a water content of 20%-30% (preferably, 25%). Then the solid residue was stirred in a mixer with a stirring speed of 800-1000 r/min for 12-20 min (preferably, 15 min).

The stirred solid residue was sent to a twin-screw extruder for blending and extrusion to obtain a modified plant fiber starch blank. A temperature of the twin-screw extruder for extrusion was 100-150° C. (preferably, 120° C.), and a water content of a raw material was controlled with 10%.

Particularly, the plant cellulose material further included a material selected from the group consisting of *Artemisia argyi*, chaff, a straw, a melon vine, a honeysuckle vine, a melon skin, a corn stalk, a corn cob, bagasse, a yam skin, reed, bamboo, a bamboo leaf and a combination thereof; preferably, the plant cellulose material included the *Artemisia argyi*, the dregs of *Scutellaria baicalensis*, the chaff, the straw, the melon vine, the honeysuckle vine, the melon skin, the corn stalk, the bagasse, the reed, the bamboo and the bamboo leave in a weight ratio of 1:4:2:1:1.5:2:3:1:2:5:1:2; the starch binder was a corn starch, a yam starch, a tuber starch, a wheat starch or a combination thereof; preferably, the starch binder was made by mixing the corn starch, the yam starch, the tuber starch and the wheat starch in a weight ratio of 1:1:4:2; and the bio-degrading enzyme was a cellulase, a lyase, an amylase or a combination thereof.

(S2) Konjac gum was subjected to pulverization and ultrafine pulverization in sequence, and then added with water followed by stirring to carry out a swelling treatment. The swollen konjac gum was separately added with water and $Ca(OH)_2$ followed by stirring, and then added with an adhesive to obtain a colloidal binder combined with a deacetylated konjac gum. Particularly, the pulverization was performed for 0.5-1 h using a ball mill; the ultrafine pulverization was performed for 0.5-1 h using an ultrafine pulverizer; the adhesive was xanthan gum, carrageenan, pectin or a combination thereof; and preferably, the adhesive was made by mixing the xanthan gum, the carrageenan and the pectin in a weight ratio of 1:1:1, and a weight ratio of the konjac gum to the adhesive was 3:7.

The swelling treatment was performed for 30-40 min (preferably, 35 min). The swelling treatment would quickly increase a specific surface area of the konjac gum and reduce a viscosity of a sol. Time for the swelling treatment was short, which was conducive to continuous production swelling. Particularly, a weight ratio of the swollen konjac gum to the water was 1:(25-100) (g/mL).

(S3) The colloidal binder was mixed with the modified plant fiber starch blank at 50-70° C. with a stirring speed of 800-1000 r/min for 0.5-1 h, and added with an antibacterial agent, a stabilizer, a foaming promoter, a dispersant and a mold release agent followed by mixing and stirring to obtain a mixture. The mixture was quantitatively divided.

Particularly, the antibacterial agent was chitosan, chitin or a combination thereof; the stabilizer was ethylene glycol, propylene glycol, maltitol, xylitol, sorbitan monostearate or a combination thereof; the foaming promoter was lauric acid, acetic acid, decanoate acid, caprylic acid, potassium bicarbonate, dipotassium hydrogen phosphate or a combination thereof; the dispersant was magnesium stearate, potassium carboxymethyl cellulose, potassium laurate, microcrystalline cellulose, carboxymethyl starch or a combination thereof; and the mold release agent was a sucrose fatty acid ester, a sucrose fatty acid polyester or a combination thereof, and a hydrophilic-lipophilic balance (HLB) value of the mold release agent is 3-6.

(S4) The mixture was subjected to foam molding in a forming mold to obtain tableware. The tableware was freely cooled to room temperature, and subjected to surface smoothing followed by drying to obtain fully degradable ecological tableware. A composition of the fully degradable ecological tableware included 60 parts by weight of the plant cellulose material, 0.3 part by weight of the bio-degrading enzyme, 10 parts by weight of the starch binder, 5 parts by weight of the colloidal binder, 8 parts by weight of the antibacterial agent, 1 part by weight of the stabilizer, 0.8 part by weight of the foaming promoter, 0.6 part by weight of the dispersant and 0.5 part by weight of the mold release agent.

The foam molding was performed under a molding pressure of 20 kPa with an upper-die temperature of 110-115° C. and a lower-die temperature of 105-110° C. for 30-40 s. In addition, after the surface smoothing, the surface of the tableware may be sprayed with a waterproof paint accordingly to obtain waterproof tableware.

Example 2

The method provided herein was basically the same with that adopted in Example 1 except that a composition of the fully degradable ecological tableware included 70 parts by weight of the plant cellulose material, 0.5 part by weight of the bio-degrading enzyme, 18 parts by weight of the starch binder, 2 parts by weight of the colloidal binder, 1 part by weight of the antibacterial agent, 0.5 part by weight of the stabilizer, 0.8 part by weight of the foaming promoter, 0.8 part by weight of the dispersant and 0.2 part by weight of the mold release agent.

Example 3

The method provided herein was basically the same with that adopted in Example 1 except that a composition of the fully degradable ecological tableware included 65 parts by weight of the plant cellulose material, 0.4 part by weight of the bio-degrading enzyme, 15 parts by weight of the starch binder, 0.5 part by weight of the colloidal binder, 0.6 part by weight of the antibacterial agent, 1 part by weight of the stabilizer, 0.6 part by weight of the foaming promoter, 0.5 part by weight of the dispersant and 1 part by weight of the mold release agent.

Example 4

The method provided herein was basically the same with that adopted in Example 1 except that a composition of the fully degradable ecological tableware included 62 parts by weight of the plant cellulose material, 0.5 part by weight of the bio-degrading enzyme, 18 parts by weight of the starch binder, 4 parts by weight of the colloidal binder, 7 parts by weight of the antibacterial agent, 1 part by weight of the stabilizer, 0.6 part by weight of the foaming promoter, 0.8 part by weight of the dispersant and 0.7 part by weight of the mold release agent.

The performance test of raw materials used in the method provided herein was conducted. The following experimental data showed that the fully degradable ecological tableware provided herein achieved the expected effect.

In step (S1), when the plant cellulose material was subjected to the ultrafine pulverization, different pulverization methods would lead to different particle size of the plant cellulose material. The particle size of the plant cellulose material pulverized by different methods was detected by a laser scattering particle size distribution analyzer, and was shown in Table 1.

TABLE 1

| Particle size of the plant cellulose material pulverized by two methods | | |
|---|---|---|
| Pretreatment of the plant cellulose material | Pulverized using a universal pulverizer | Pulverized using a universal pulverizer and an ultrafine pulverizer |
| Particle size | 28.36 μm | 19.94 μm |
| Particle size distribution | 2.34-138 μm | 0.68-63.79 μm |

Table 1 showed that the plant cellulose material pulverized using the universal pulverizer had a wide particle size distribution of 2.34-138 μm, whereas after being pulverized using the ultrafine pulverizer, the plant cellulose material had a particle size distribution of 0.68-63.79 μm, and 95% of the pulverized plant cellulose material had in particle size within 3-48 μm. Therefore, the particle size of the plant cellulose material was largely reduced through the ultrafine pulverization, which facilitated the release of antibacterial active substances in the *Artemisia argyi* and dregs of *Scutellaria baicalensis*.

In step S2, the konjac gum was processed by ball milling and ultrafine pulverization, and the swelling performance and viscosity of the konjac gum were determined according to the industry standard. Particularly, a 1% (mass-volume ratio) konjac powder sol was prepared, and subjected to a water bath at 30° C. A digital display viscometer was used to measure the viscosity with a No. 4 rotor and a rotation speed of 12 r/min. An apparent viscosity was calculated according to a maximum average value. Full swelling time was the time when the apparent viscosity of the konjac powder sol reached the maximum value.

TABLE 2

Particle size distribution of the konjac gum before and after the treatment

| Pretreatment of the konjac gum material | Before the treatment | After the treatment (Pulverization for 0.5 h using a ball miller + pulverization for 0.5 h an ultrafine pulverizer) |
|---|---|---|
| Average particle size | 150.10 μm | 45.24 μm |
| Particle size distribution | 20-400 μm | 19.82-60.48 μm |

Table 2 showed that the konjac gum before the treatment had a wide particle size distribution of 20-400 and the konjac gum after the ultrafine pulverization had a particle size distribution of 19.82-60.48 In addition, 95% of the konjac gum after the ultrafine pulverization had a particle size within 40-50 Therefore, the konjac gum had a smaller particle size after being subjected to the ball milling and ultrafine pulverization.

In the swelling treatment of konjac gum in step S2, the swelling time and apparent viscosity changes were analyzed experimentally.

TABLE 3

Swelling time and apparent viscosity of the konjac gum before and after the treatment

| Konjac gum (1%) | Before the treatment | After the treatment (Pulverization for 0.5 h using a ball miller + pulverization for 0.5 h an ultrafine pulverizer) |
|---|---|---|
| Swelling time | 210-240 min | 30-40 min |
| Apparent viscosity | 8.08-8.55 Pa·s | 1.80-4.17 Pa·s |

Table 3 showed that the konjac gum before the treatment had a swelling time of 210-240 min and an apparent viscosity of 8.08-8.55 Pa·s; and after the 0.5-h ball milling and the 0.5-h ultrafine pulverization, the swelling time was shortened to 30-40 min, and the apparent viscosity dropped to 1.80-4.17 Pa·s. Therefore, the konjac gum after being pulverized by the ball miller and the ultrafine pulverizer had a refined particle size, a higher swelling speed and a lower apparent viscosity. The shortened swelling time of the konjac gum was conducive to the continuous production of disposable tableware.

In step S2, the konjac gum was mixed with the xanthan gum and the carrageenan, respectively, and the synergistic thickening effect of the konjac gum-xanthan gum system and the konjac gum-carrageenan system was detected. 100 mL of a 0.5% konjac gum-xanthan gum (weight ratio, 1:1) solution and 100 mL of a 0.5% konjac gum-carrageenan (weight ratio, 1:1) solution were respectively prepared, and were stirred at 60° C. for 30 min followed by cooling to room temperature. An NDJ-1 rotational viscometer (Shanghai Zhongchen Digital Technology Equipment Co., Ltd, Shanghai, China) was used to measure the viscosity at 60 r/min.

Figure 2:
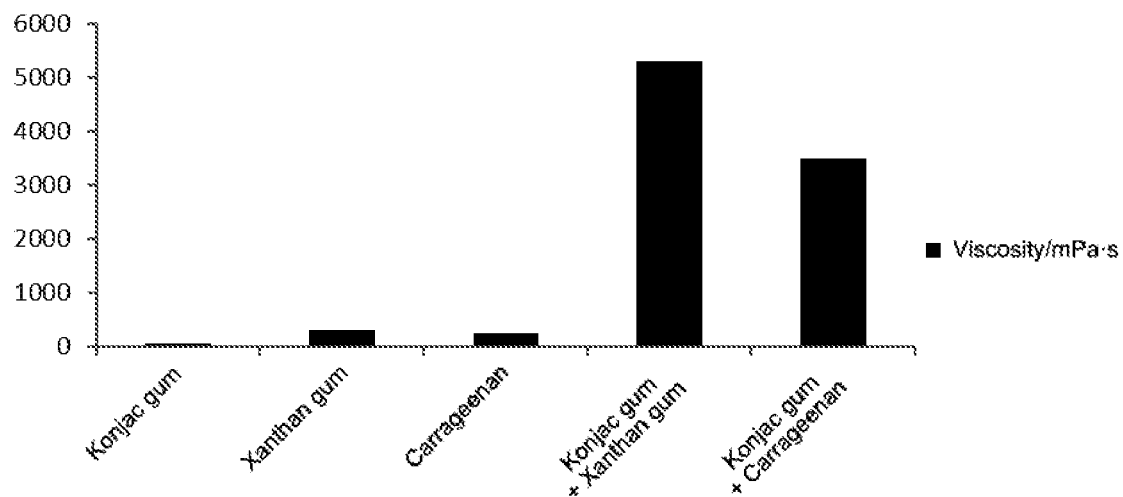
FIG. 2 shows viscosities of konjac gum, xanthan gum, carrageenan and combinations thereof.

FIG. 2 showed that the viscosity of the konjac gum-xanthan gum solution and the konjac gum-carrageenan solution was larger than that of any solution only containing one of the konjac gum, the xanthan gum and the carrageenan, indicating that the konjac gum-xanthan gum system and the konjac gum-carrageenan system had a strong synergistic effect.

The fully degradable ecological tableware provided herein was tested for various performances, in which the mechanical performance was tested as follows.

The prepared tableware was cut into a 100 mm×15 mm strip with a paper cutter, and was tested using an electronic universal testing machine. Particularly, a stretching rate was 10 mm/min (constant speed stretching); an effective clamping distance was 80 mm; and the test was repeated 3 times to obtain an average value.

A tensile strength σt (MPa) was calculated according to formula (1):

$$\sigma t = \frac{p}{bd}; \quad (1)$$

in which, p was a breaking load (N); b was a width (mm) of a sample; and d was a thickness (mm) of the sample.

An elongation εt (%) at break was calculated according to formula (2):

$$\varepsilon t = \frac{L - L0}{L0}; \quad (2)$$

in which, $L_0$ was an original marking distance (mm) of the sample; and L was a marking distance when the sample was broken (mm).

A water vapor permeability (WVP) of the fully degradable ecological tableware was tested as follows.

$CaCl_2$ was crushed into uniform particles, and was dried at 200° C. in an oven for 2 h followed by cooling. A weighing bottle was dried at 105° C. in a drying oven for 1 h before use, and was taken out when it dropped to 65° C. to place in a desiccator. The dried $CaCl_2$ was put into the weighing bottle at 25° C. Five points equally distributed on a uniform, non-porous and wrinkle-free tableware film were selected, and thickness of the tableware film at five points was measured using a micrometer. The tableware film covered an opening of the weighing bottle, and was fastened on the weighing bottle through an adhesive tape and a paper tape. The weighing bottle was weighted and put into a constant temperature and humidity box for 24 h (temperature 25° C., relative humidity 58%). An increase in the weight of the weighing bottle during this period was measured, and the water vapor permeability coefficient [g·M/(m²·s·Pa)] was calculated according to formula (3):

$$WVP = \frac{\Delta m \times d}{A \times t \times \Delta p}; \quad (3)$$

in which, Δm was the increased weight (g) the weighing bottle; A was a permeation area (m²); d was a thickness (m) of the tableware film; t was time change (s); and Δp (1837.25 Pa) was a difference of water vapor pressures on both sides of the tableware film.

A deacetylation degree of the deacetylated konjac gum obtained in step (S2) was measured. The deacetylation degree (DD) was defined as a weight ratio of removed acetyl groups to total acetyl groups in konjac gum (KGM) molecule, and was measured as follows.

5.00 g of a sample was put into a conical flask with a stopper, and was added with 50 mL of 75% (v/v) ethanol. The sample solution was subjected to a thermostat water bath at 50° C. for 30 min. After being cooled to room temperature, the sample solution was added with 5 mL of 0.5 mol/L KOH followed by fully shaking, and was saponified at 30° C. for 48 h in a digital thermostat water bath shaker. An excess alkali was titrated with 0.1 mol/L HCl, and phenolphthalein was used as an indicator. The experiment was repeated 3 times to obtain an average value. The deacetylation degree was calculated as according to formula (4):

$$DD(\%) = \frac{(V_2 - V_1) \times (1 - \omega_0)}{(V_0 - V_1) \times (1 - \omega_1)} \times 100\%; \quad (4)$$

in which, $V_0$ was a volume (mL) of hydrochloric acid consumed by a blank control; $V_1$ was a volume (mL) of hydrochloric acid consumed by a KGM raw powder; $V_2$ was a volume (mL) of hydrochloric acid consumed by deacetylated KGM; $\omega_0$ was a water content (%) of the KGM raw powder; and Wi was a water content of the deacetylated KGM.

TABLE 4

Deacetylation degree of konjac gum under different alkali content

| N(OH—):n(acetyl) | M(Ca(OH)$_2$):m(Konjac gum) | Deacetylation degree of konjac gum |
|---|---|---|
| 1:8 | 1:1312 | 0.22 ± 0.02 |
| 2:8 | 1:656 | 0.31 ± 0.01 |
| 4:8 | 1:328 | 0.53 ± 0.02 |
| 5:8 | 1:262 | 0.71 ± 0.01 |
| 7:8 | 1:187 | 0.91 ± 0.02 |
| 16:8 | 1:82 | 0.99 ± 0.01 |

Table 4 showed that the deacetylation degree of the konjac gum prepared with different ratios of Ca(OH)$_2$ was different.

Table 5 showed the effect of the deacetylation degree of konjac gum on the tensile strength, elongation at break, and water vapor permeability parameter of the prepared tableware.

TABLE 5

Effect of the deacetylation degree of konjac gum on the tensile strength, elongation at break, and water vapor permeability parameter

| Deacetylation degree of konjac gum | Tensile strength MPa | Elongation at break % | Water vapor permeability parameter × $10^{-11}$ [g · m/(m$^2$ · s · Pa)] |
|---|---|---|---|
| 0 | 2.8 ± 0.2 | 16.5 ± 0.1 | 5.3 ± 0.2 |
| 0.3 | 3.7 ± 0.1 | 18.3 ± 0.2 | 4.5 ± 0.1 |
| 0.5 | 6.1 ± 0.3 | 20.2 ± 0.2 | 4.2 ± 0.3 |
| 0.7 | 12.2 ± 0.2 | 22.5 ± 0.1 | 3.5 ± 0.1 |
| 1.0 | 12.3 ± 0.1 | 22.7 ± 0.3 | 3.2 ± 0.2 |

Table 5 showed that as the deacetylation degree of konjac gum increased, the tensile strength and elongation at break of the prepared tableware increased, while the removal of acetyl groups enhanced the hydrophobic property of konjac gum and reduced the water vapor permeability parameter, indicating that the deacetylation process obviously affected the mechanical properties of the degradable tableware, and the degradable tableware prepared after the deacetylation would well inhibit the permeation of water vapor to allow the material to be hydrophobic and waterproof. In summary, the desirable deacetylation degree of konjac gum should be 0.7-1.0.

Table 6 showed the effect of a ratio of the konjac gum and the adhesive (xanthan gum:carrageenan:pectin=1:1:1) on the tensile strength, elongation at break, and water vapor permeability parameter of the prepared tableware, and the deacetylation degree of the konjac gum was 0.7.

TABLE 6

Effect of the ratio of the konjac gum and the adhesive on the tensile strength, elongation at break, and water vapor permeability parameter

| Konjac gum:(xanthan gum:carrageenan:pectin = 1:1:1) | Tensile strength MPa | Elongation at break % | Water vapor permeability parameter × $10^{-11}$ [g · m/(m$^2$ · s · Pa)] |
|---|---|---|---|
| 10:0 | 4.2 ± 0.1 | 21.1 ± 0.1 | 6.7 ± 0.2 |
| 7:3 | 6.8 ± 0.1 | 17.3 ± 0.2 | 5.3 ± 0.1 |
| 5:5 | 8.2 ± 0.3 | 15.2 ± 0.1 | 4.1 ± 0.3 |
| 3:7 | 13.1 ± 0.2 | 13.5 ± 0.1 | 3.8 ± 0.3 |
| 0:10 | 11.2 ± 0.1 | 10.7 ± 0.2 | 2.5 ± 0.2 |

Table 6 showed that as the ratio of the adhesive (xanthan gum:carrageenan:pectin=1:1:1:) increased, the tensile strength was increased, and when the ratio of the konjac gum to the adhesive reached 3:7, the tensile strength decreased; the elongation at break decreased as the ratio of the adhesive (xanthan gum:carrageenan:pectin=1:1:1) increased; and as the ratio of the adhesive increased, the water vapor permeability parameter decreased. In summary, the desirable ratio of the konjac gum to the adhesive (xanthan gum:carrageenan:pectin=1:1:1) was 3:7.

Molding performance of the fully degradable ecological tableware prepared herein was tested by setting different upper-die temperature, lower-die temperature and pressure holding time. The results were shown in Table 7.

TABLE 7

Effect of temperature and pressure holding time on the molding performance of the tableware

| Upper-die temperature/ ° C. | Lower-die temperature/ ° C. | Pressure holding time/s | Molding performance | Product performance |
|---|---|---|---|---|
| 100 | 95 | 30 | unmolded and stuck to the die | incomplete |
| 105 | 100 | 30 | unmolded and stuck to the die | incomplete |
| 110 | 105 | 30 | complete and easy to demold | complete |
| 115 | 110 | 30 | complete and easy to demold | complete |
| 120 | 115 | 30 | complete and easy to demold | scorched |

Table 7 demonstrated that the optimum upper-die temperature was 110-115° C. and the optimum lower-die temperature was 105-110° C. for the molding. Too high temperature would scorch the product.

After determining the optimum upper-die temperature and the optimum lower-die temperature for the forming mold, the influence of the pressure holding time on the forming performance of the tableware was tested. The results were shown in Table 8.

TABLE 8

Effect of the pressure holding time on the forming performance of tableware

| Upper-die temperature/ ° C. | Lower-die temperature/ ° C. | Pressure holding time/s | Molding performance | Product performance |
|---|---|---|---|---|
| 110 | 105 | 20 | unmolded and stuck to the die | incomplete |
| 110 | 105 | 30 | complete and easy to demold | complete |
| 110 | 105 | 40 | complete and easy to demold | complete |
| 110 | 105 | 50 | complete and easy to demold | scorched |

Table 8 showed that the desirable pressure holding time was 30-40 s.

The fully degradable ecological tableware prepared herein was subjected to a performance evaluation, including physical property, water resistance, oil resistance, change rate under a load and biodegradability. The results were shown in Table 9.

TABLE 9

Performance evaluation of the tableware

| Evaluation category | Test item | Test result of the sample |
|---|---|---|
| Physical property | water content | <5% |
| Water resistance | water resistance test (90° C., 1 h) | No water leaking |
| Oil resistance | oil resistance test (90° C., 1 h) | No oil leaking |
| Change rate under a load | height change rate under a load/% | 0 |
| Biodegradability | weight loss rate of soil (28 d) | 82.67% |

An antibacterial test was performed on the fully degradable ecological tableware provided herein, and a method for determining an inhibition zone was described as follows.

A sterilized small round filter paper (D=5 mm) was dipped in a compound solution to obtain a sample filter paper. 0.2 mL of a suspension of indicator bacteria was taken and applied to a corresponding culture plate. Three pieces of small round filter paper with the same composition were stuck on each plate. The bacteria-containing plate with the filter paper was put upside down into an incubator for culturing, and then was taken out to observe a size of the inhibition zone.

The main microorganisms in the air include bacteria (G+, G−), fungi (mold, yeast). The *Artemisia argyi*, dregs of *Scutellaria baicalensis* and chitosan, added as the antibacterial agent, provided the fully degradable tableware with a bactericidal effect. A sterilization rate of *Escherichia coli* was 100%. A sterilization rate of *Bacillus subtilis* was 100%. A sterilization rate of *Staphylococcus aureus* was 100%. A sterilization rate of *Penicillium* was 98.7%. A sterilization rate of yeast wad 96.4%.

In addition, the source, composition, ratio, combined molecular weight and amylose/amylopectin ratio of different starch binders were different. The performance parameters were shown in Table 10.

TABLE 10

Performance parameters of different starch binders

| Starch source | Amylose | Amylopectin | Ratio of amylose to amylopectin | Particle diameter |
|---|---|---|---|---|
| Corn starch | 26 | 74 | 0.35 | 3-26 μm |
| Rice starch | 17 | 83 | 0.22 | 3-45 μm |
| Wheat starch | 24 | 76 | 0.32 | 2-35 μm |
| Potato starch | 21 | 79 | 0.27 | 5-100 μm |

Table 10 showed that the ratio of amylose to amylopectin in different starch materials was different. Amylose is unstable after heating and gelatinization in water, and it will age rapidly and gradually form a gel. Such gel is hard and needs to be at a temperature of 115-120° C. to transform in an opposite direction. Amylopectin is stable in aqueous solution, and the gelation rate of the amylopectin is much slower than that of amylose. The gel formed through the amylopectin is soft. Furthermore, the strength of the gel formed through the different starch binders was tested using a texture analyzer, and the test steps were described as follows.

Samples of different starches were heated in a water bath at 95° C. for 20 min to completely gelatinize. The gelatinized samples were respectively poured into a weighing bottle with a diameter of 40 mm and a depth of 25 mm, and sealed with plastic wrap. The weighing bottles were placed at 4° C. in a refrigerator for 24 h to prepare starch gels to be tested.

A cylindrical probe TA5 was selected. A compression ratio was 50% of a sample height. A pressing speed was 1.5 mm/s. A speed after contact was 1.0 mm/s. A lifting speed was 1.0 mm/s. A trigger force was 2 g. A peak pressure required to compress the sample was recorded as the gel strength. The results were shown in Table 11.

TABLE 11

Strength of the gels formed through different starch binder

| Starch source | Gel strength (peak pressure, dyn/cm$^2$) |
|---|---|
| Corn starch | 7020 ± 13 |
| Rice starch | 6136 ± 21 |
| Wheat starch | 6890 ± 20 |
| Potato starch | 6530 ± 26 |

Tables 10-11 showed that the corn starch with the highest ratio of amylose to amylopectin had the highest gel strength, and was most conducive to prepare degradable tableware with a certain strength. Therefore, the corn starch is the preferred starch binder.

Furthermore, in order to increase the ratio of amylose to amylopectin in the starch binder, in step S3, the starch adhesive needed to be pretreated by autoclave before use. Particularly, a certain amount of the starch binder (such as corn starch) was dissolved in distilled water to an emulsion with a starch concentration of 30% followed by treating with high temperature and high pressure (100-120° C., 100-120 kPa) for 30-60 min.

The autoclave treatment destroyed the structure of starch granules, such that the amylopectin gradually dissolved from the starch granules, and then the starch molecular chains approached and rearranged each other during the cooling and retrogradation process. The starch retrogradation gradually occurred, and an orderly recrystallized starch was formed. Part of the crystallized area would prohibit the combination of the active part of amylase with the crystallized area, producing resistance to the amylase, which was conducive to adhesion and degradation.

The beneficial effects of the present disclosure are described as follows.

1. The raw material provided herein is advantageous. *Artemisia argyi*, a broad-spectrum antibacterial and antiviral drug, can inhibit and kill on various bacteria and viruses, and has a certain prevention and treatment effect on respiratory diseases. An extract liquid of *Artemisia argyi* water has a good antibacterial effect on *Staphylococcus aureus* and *Escherichia coli*.
2. Baicalin is extracted from the raw medicinal material and dregs of *Scutellaria baicalensis*. Baicalin has a wide antibacterial range, and has a strong effect on *Staphylococcus aureus* and *Pseudomonas aeruginosa*. The antibacterial performance of ecological tableware is improved through adding with the dregs of *Scutellaria baicalensis*.
3. Starch-based biodegradable material products have good mechanical strength, strong flexibility, high impact resistance, strong temperature resistance, good water resistance and oil resistance. In addition, they have no softening, no deformation, and have strong plasticity.
4. At present, most konjac glucomannan products have large particles and long swelling time, which is very inconvenient to use, especially in continuous production. The ball milling and ultrafine pulverization can greatly shorten the swelling time of the konjac gum.
5. The konjac gum has a good synergistic thickening effect with a thickener such as xanthan gum, carrageenan and a starch.
6. The rural resource such as straw, wheat husk, bagasse and corncob has been fully used to turn waste into treasure. The product prepared herein has an overall structure, smooth and clean surface, and good strength. The outer surface of the product can be printed with trademarks, advertisements and manuals.
7. Starch is a kind of biodegradable natural polymer, which will be decomposed into glucose under the action of microorganisms, and finally decomposed into water and carbon dioxide, having no pollution to the environment. Other materials mixed with the starch are also fully degradable, and thus the lunch box prepared by those materials has excellent degradability, and becomes fertilizer when entering the soil and becomes feedstuff when entering the water.

Technical solutions without a conflict in the above-mentioned embodiments can be combined with each other.

Mentioned above are merely preferred embodiments of the disclosure, and not intended to limit the present disclosure. Modifications, equivalent replacements and improvements made by those skilled in the art without departing from the spirit of this disclosure should fall within the scope of the present disclosure defined by the appended claims.

What is claimed is:

1. A method for preparing a fully-biodegradable plant fiber starch tableware, comprising:
   (S1) adding water into a plant cellulose material containing *Scutellaria baicalensis* dregs followed by stirring to obtain a slurry; filtering the slurry to collect a solid residue; subjecting the solid residue to drying, pulverization, sieving and ultrafine pulverization to obtain a dried and pulverized solid residue; adding a starch adhesive and a bio-degrading enzyme into the dried and pulverized solid residue; adjusting temperature and water content followed by stirring in a stirrer to obtain a first mixture; and feeding the first mixture to a twin-screw extruder followed by blending and extrusion to obtain a modified plant fiber starch blank;
   (S2) subjecting konjac gum to pulverization and ultrafine pulverization in sequence to obtain a pulverized konjac gum; swelling the pulverized konjac gum in water under stirring to obtain a swollen konjac gum; separately adding water and $Ca(OH)_2$ into the swollen konjac gum followed by stirring; and adding an adhesive to obtain a deacetylated konjac gum-compounded colloidal adhesive;
   (S3) mixing the deacetylated konjac gum-compounded colloidal adhesive with the modified plant fiber starch blank; and adding an antibacterial agent, a stabilizer, a foaming promoter, a dispersant and a mold release agent followed by stirring and quantitative division to obtain a mixture; and
   (S4) subjecting the mixture to foam molding in a forming mold to obtain a crude tableware; and cooling the crude tableware to room temperature followed by drying to obtain the fully-biodegradable plant fiber starch tableware.

2. The method of claim 1, wherein the fully-biodegradable plant fiber starch tableware comprises 60-70 parts by weight of the plant cellulose material, 0.3-0.6 part by weight of the bio-degrading enzyme, 10-20 parts by weight of the starch adhesive, 0.5-5 parts by weight of the deacetylated konjac gum-compounded colloidal adhesive, 0.5-8 parts by weight of the antibacterial agent, 0.5-1 part by weight of the stabilizer, 0.5-1 part by weight of the foaming promoter, 0.5-1 part by weight of the dispersant and 0.2-1 part by weight of the mold release agent.

3. The method of claim 2, wherein the plant cellulose material further comprises a material selected from the group consisting of *Artemisia argyi*, chaff, straw, melon vine, honeysuckle vine, melon skin, corn stalk, corn cob, bagasse, yam skin, reed, bamboo, bamboo leave and a combination thereof.

4. The method of claim 2, wherein the starch adhesive is a corn starch, a yam starch, a tuber starch, a wheat starch or a combination thereof; and the adhesive is xanthan gum, carrageenan, pectin or a combination thereof.

5. The method of claim 2, wherein the bio-degrading enzyme is a cellulase, a lyase, an amylase or a combination thereof.

6. The method of claim 1, wherein the antibacterial agent is chitosan, chitin or a combination thereof.

7. The method of claim 1, wherein the stabilizer is ethylene glycol, propylene glycol, maltitol, xylitol, sorbitan monostearate or a combination thereof; and the foaming promoter is lauric acid, acetic acid, decanoate acid, caprylic acid, potassium bicarbonate, dipotassium hydrogen phosphate or a combination thereof.

8. The method of claim 1, wherein the dispersant is magnesium stearate, potassium carboxymethyl cellulose, potassium laurate, microcrystalline cellulose, carboxymethyl starch or a combination thereof and the mold release agent is a sucrose fatty acid ester, a sucrose fatty acid polyester or a combination thereof and a hydrophilic-lipophilic balance (HLB) value of the mold release agent is 3-6.

9. The method of claim 1, wherein the swelling is performed for 30-40 min; and a weight-volume ratio of the pulverized konjac gum to the water 1 (g):(25-100) (mL).

10. The method of claim 1, wherein the foam molding is performed under the following conditions: an upper-die temperature is 110-115° C.; a lower-die temperature is 105-110° C.; a pressure holding time is 30-40 s; and a molding pressure is 20 kPa.

* * * * *